Nov. 21, 1961 W. E. MILLER 3,009,480
FLOW CONTROL VALVE WITH AXIAL FORCE
STABILIZING SPOOL OR PLUNGER
Filed Sept. 25, 1959 2 Sheets-Sheet 1

*INVENTOR*
WENDELL E. MILLER

BY Hubert Miller
*ATTORNEY*

INVENTOR
WENDELL E. MILLER

BY Hubert Miller
ATTORNEY they will know that have know have know they that have know they that have have that have know they that have know they that have know they that have know they that have know# United States Patent Office 3,009,480
Patented Nov. 21, 1961

3,009,480
FLOW CONTROL VALVE WITH AXIAL FORCE STABILIZING SPOOL OR PLUNGER
Wendell E. Miller, Hutchinson, Kans., assignor to Cessna Aircraft Company, Wichita, Kans., a corporation of Kansas
Filed Sept. 25, 1959, Ser. No. 842,439
1 Claim. (Cl. 137—620)

This invention relates generally to spool or plunger type fluid flow control valves for controlling the flow of fluid to and from a hydraulic cylinder or other type of hydraulic motor.

As is well known, a conventional spool-type valve includes an elongated body which has a longitudinal bore in which a flow control spool or plunger is slidable. The valve body includes at least two adjacent axially-spaced enlarged diameter grooves or chambers which surround and communicate with the bore, and which are separated by an annular seat land. The inner surface of the seat land constitutes a part of the spool bore, and the land has flat parallel generally annular end faces which are perpendicular to the axis of the spool. These end faces will herein be referred to as control faces.

The spool in such a valve includes at least two axially-spaced generally cylindrical lands of a diameter to slidably seal against the bore wall in the valve body, including the inner surface of the seat land. These spool lands are connected by a reduced diameter concentric shank formed by an annular groove in the spool. The adjacent faces of the lands are annular, planar, and lie in parallel planes which are perpendicular to the spool axis. The faces of these lands are spaced apart a distance greater than the axial dimension of the seat land in the valve body. These faces will also be referred to hereinafter as control faces, because they cooperate with the control faces on the seat land to block fluid flow between the two mentioned valve chambers.

When the spool is properly positioned longitudinally in the valve body, the groove between the lands on the spool cooperates with the seat land on the valve body to define a fluid flow passage between the two chambers in the valve body.

However, when the spool is moved longitudinally in either direction, the control face on one or the other of the spool lands approaches, meets and passes the adjacent control face on the seat land, thus positively blocking the flow of fluid from either valve chamber to the other.

As a control face on a spool land approaches a control face on the seat land, the flow orifice between the two valve chambers is progressively reduced in area and the orifice is truly annular in shape because of the described configuration and dispositon of the two control faces. As the flow area of the orifice is reduced, the flowing pressure fluid undergoes a momentum change causing a dynamic reaction which sets up a force system which acts on the spool. This force system includes components which are primarily radial in direction and others which vary from radial to primarily axial in direction. The normal or primarily radial components of this force system balance out due to the symmetrical construction of the spool. The axial components are unbalanced, and act to urge the spool in a direction toward a flow-blocking position, whether the spool is being moved upstream or downstream with relation to the direction of flow of the fluid from one valve chamber to the other. The mechanism of these forces is well known.

It has been established that the magnitude of the axial forces exerted on the spool is dependent upon four factors, namely: the pressure urging fluid flow through the valve; the volume of pressure fluid flowing through the annular orifice defined by the control faces on the spool lands and seat land; the permitted flow area through the orifice defined by the lands, which in turn depends on the position of the spool with relation to the valve body; and finally, the angular direction of flow of the fluid with respect to the spool axis as the fluid flows into or out of the flow passage connecting the two valve chambers. This latter factor is dependent on the configuration of the spool lands, or the seat land, or of both.

Tests have established that in the conventional valve described above the direction of fluid flow through the variable flow passage is neither parallel to the long axis of the spool nor perpendicular to that axis, but is at an acute angle to the spool axis; that the total unbalanced axial forces exerted on the spool by the dynamic reaction of the flowing fluid increases as this flow angle decreases; that this acute flow angle is decreased when the control faces on the respective lands are perpendicular to the spool axis; that the total axial forces created by the dynamic reaction of the flowing fluid are greater when the flow orifice is a complete annulus; and that such axial forces increase as pressure increases. The magnitude of this axial force reaches a maximum at the time a control face on one spool land begins to leave or closely approaches the adjacent control face on the seat land because at this time the flow orifice is a mere crack, and fluid is being metered through the orifice at maximum system pressure.

The net result is that the operator who is moving the valve must cope with a varying external force being exerted axially on the spool. As he moves the spool in a direction to stop fluid flow to the motor which he is attempting to closely control, this axial force increases and "snaps" the spool into a flow-blocking position. The same axial force resists the manual effort of the operator to move the spool away from a closed or fluid-blocking position. Thus the operator has a tendency to over control or under control the spool valve, with resulting erratic control of the fluid actuated motor or cylinder. Also, in an automatic control system in which an electric or hydraulic signal is amplified through a hydraulic system, the unbalanced axial force exerted on the spool interferes with accurate amplification of the signal, causing unstable control of the motor.

It is a general object of my invention to provide a spool-type valve which is so constructed as to reduce to a minimum the unbalanced axial forces exerted on the flow control spool as a result of the dynamic reaction of the fluid flowing under high pressure from one valve chamber in the valve to an adjacent axially spaced valve chamber, thereby improving accuracy of valve control by the operator.

It is a more specific object to provide a valve construction in which the truly annular configuration of the flow orifice between valve chambers is modified in a manner to reduce the dynamic reaction of the flowing fluid.

It is an additional object to provide a valve construction in which the configuration and disposition of the control faces on the spool lands, or on the seat land, or on both, is modified in a manner to change the angular direction of flow of the fluid from a sharp acute angle with respect to the spool axis to a flow angle which closely approaches 90° with respect thereto, thereby reducing to almost zero the axial components of force imparted to the spool due to the dynamic reaction of the flowing fluid. In this connection, the unbalanced axial force exerted on the spool is a function of the cosine of the flow angle. Hence this axial force approaches zero as the flow angle approaches 90°.

It is a still further object of the invention to provide a modified land and control face configuration, either for the spool lands, the seat land or for both, which will cause the flowing fluid to exert a reaction force on the spool which opposes the described undesirable axial force components.

The invention, together with other objects, will be more clearly understood when the following description is read in connection with the accompanying drawings, in which.

Figure 1:
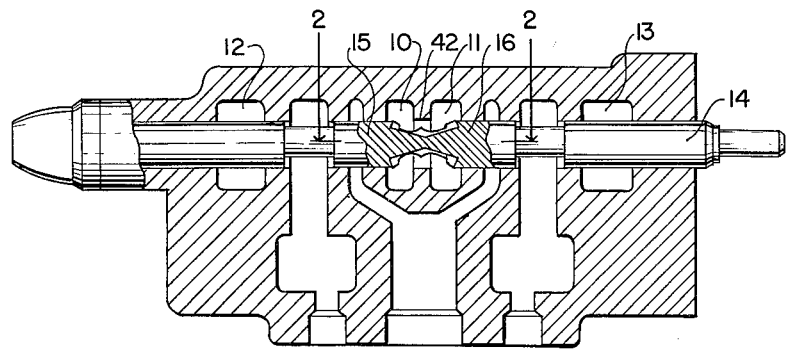
FIG. 1 is an axial sectional view through a simplified open-center control valve embodying my invention, the flow control spool being in neutral or centered position.

The FIG. 1 valve is designed for inclusion in a multiple bank of such control valves, and serves to control fluid to and from both ends of a double acting motor. In its neutral position, as in FIG. 1, the spool hydraulically locks the motor and unloads the system by permitting free flow of fluid from the main supply into valve chamber 11 to chamber 10 and thence through the valve bank and back to the system reservoir through return passages 12 or 13. Movement of the spool 14 in either direction from its neutral position blocks communication between chambers 10 and 11 and establishes flow to one end of the controlled motor while affording flow of return fluid from the other end of the motor back to the reservoir through return passages 12 or 13, as the case may be.

In this valve the invention is illustrated in connection with only the two adjacent spool lands 15 and 16 which control fluid flow through the central by-pass passages 10 and 11, primarily because it is here that the greatest velocity flow and the greatest pressure changes occur. It can as easily be embodied in either or both ends of any individual land of any valve flow control spool, or of any seat land.

Figure 4:
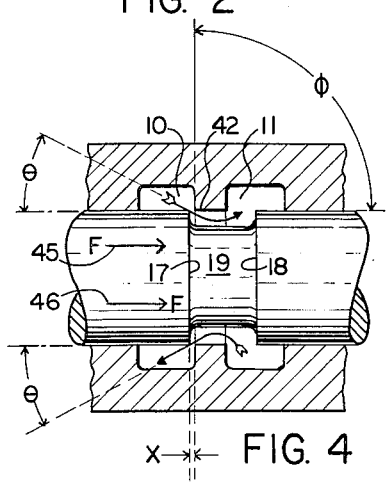
FIG. 4 is a fragmentary sectional view through a similar valve having a conventional spool with planar control faces perpendicular to the spool axis, and illustrates the angle of flow of fluid therethrough in both directions.

FIG. 4 illustrates a flow control spool of a conventional type having annular control faces 17 and 18 which lie in parallel planes which are normal to the long axis of the spool, and which are separated by an annular groove which forms a reduced diameter shank 19 which is concentric with the adjacent lands.

A valve spool such as illustrated in FIG. 4 can be easily modified to embody my invention.

Figure 9:
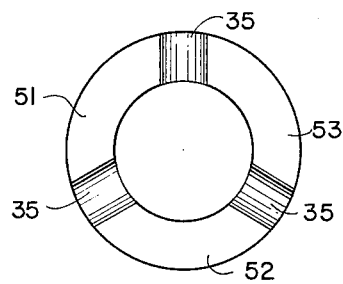
FIGS. 9, 10 and 11 are schematic views of land control faces modified in accordance with my invention, and illustrate a few of the many possible port arrangements which can be used to produce the desired results.
Figure 10:
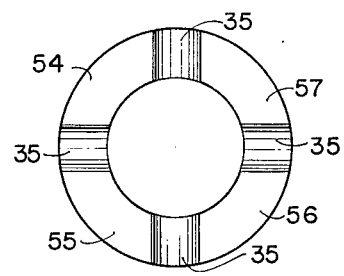
Figure 11:
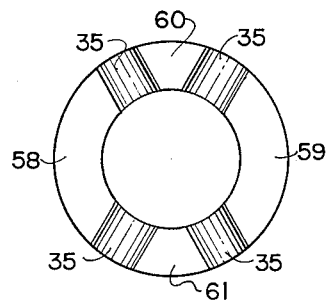

My invention provides a land control face which includes circumferentially spaced co-planar portions 49 and 50 (FIG. 6) which lie in a plane perpendicular to the spool axis, and which are located symmetrically about such axis. In that embodiment illustrated in FIGS. 1, 2, 3, 5 and 6 only two such co-planar face portions are employed, and they are of the same size and are located diametrically opposite each other. FIG. 9 illustrates a control face having three such co-planar face portions 51, 52 and 53, equally spaced circumferentially; FIG. 10 illustrates a land control face having 4 equally spaced co-planar face portions 54, 55, 56 and 57; and FIG. 11 illustrates two relatively large co-planar face portions 58 and 59 identical in size and diametrically opposite, and two relatively small identically sized co-planar face portions 60 and 61. Symmetrical locations are desirable in order to balance the forces acting on the spool at any two diametrically opposite points. Any tendency of the reactive forces to bind the spool in its bore is thus eliminated.

Figure 5:
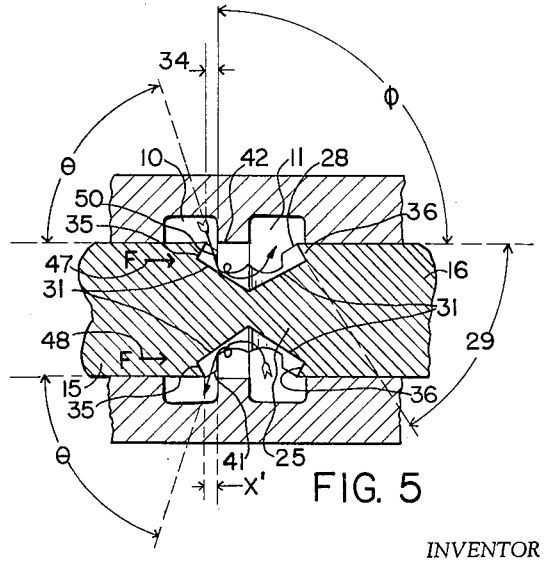
FIG. 5 is an axial section taken along the line 5—5 of FIG. 2, and illustrates the angle of flow of fluid through a flow path defined by a spool embodying my invention.
Figure 6:
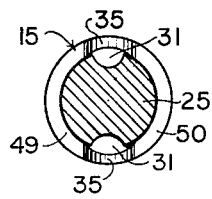
FIG. 6 is a transverse sectional view taken along the plane indicated by the line 6—6 of FIG. 3.

Regardless of the number of such co-planar face portions employed, the adjacent ends of each adjacent pair of them are joined or connected by control face portions 35 which are offset axially into the land with respect to the plane in which the co-planar portions lie, and which are undercut with respect to the adjacent peripheral portions of the land, as clearly shown in FIG. 5. This configuration applies whether the control face is on the spool land, or on a seat land, or on both.

Figure 7:
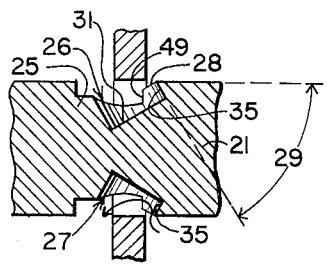
FIG. 7 is a view similar to FIG. 5, and illustrates the inventive principle applied to a single land of a spool rather than to two adjacent lands.

This control face configuration may be produced by milling or otherwise cutting into the land laterally along a radius but at a variable acute angle 29 (FIGS. 5 and 7) with respect to the long axis of the spool or the spool bore, as the case may be. Such cuts or notches are clearly shown in FIG. 7. In this case the cuts are made diametrically opposite each other and form flow ports which are designated as a whole by the numerals 26 and 27. These cuts are illustrated as being made with a flat end milling tool, and the offset undercut face portions 35 are therefore arcuate. The cuts may be made with a broaching tool, and the faces 35 do not have to be arcuate. In any case each port cut has a flat bottom or end wall 31 (FIG. 7) a portion of which extends into the spool shank 25, and lies substantially perpendicular to the wall 35. A control edge 28 of each port is offset axially into the peripheral surface of the land for a variable distance 34, FIGS. 2 and 5.

Figure 2:
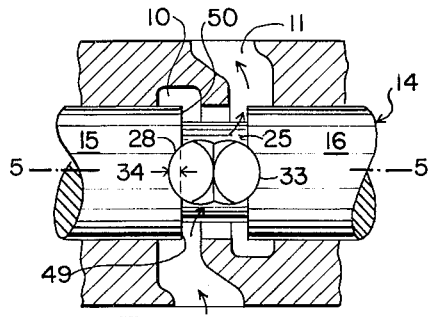
FIG. 2 is an enlarged fragmentary sectional view taken along the line 2—2 of FIG. 1, metering ports in the spool being shown in plan view.
Figure 3:
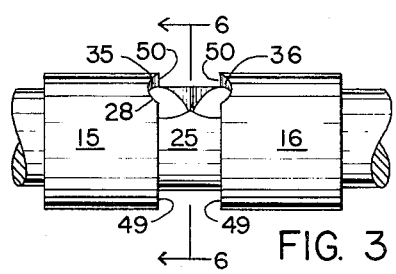
FIG. 3 is a fragmentary perspective view of the spool of my invention illustrating details in the configuration of metering ports cut partially into the spool lands and partially into the grooved portion of the spool between adjacent lands.

When two adjacent lands on a spool are modified in accordance with the invention the ports are in pairs, each pair preferably being aligned longitudinally along the spool, as clearly shown in FIGS. 2, 3 and 5, and the ports in each pair are cut at opposite identical acute angles so that the offset face portions 35 and 36 (FIG. 5) are undercut to the same degree. In the spool shown, the land spacing is such that the adjacent edges of the ports overlap slightly, but this is not necessary. In all cases the angle 29 and the offset distance 34 (FIGS. 2 and 3) may be varied by design to provide the desired degree of reduction in the axial force components imparted to the spool by the dynamic reaction of the fluid flowing under high pressure through the orifice defined by the control faces on the spool and seat lands, from chamber 10 to chamber 11, or vice versa.

Figure 8:
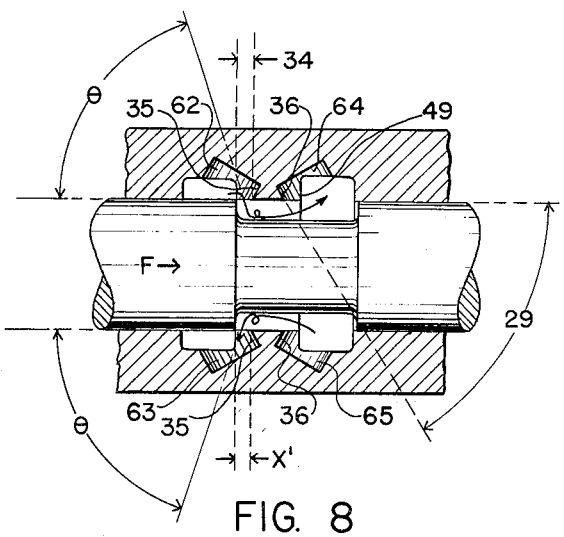
FIG. 8 is a view similar to FIG. 5, but illustrates a construction in which the seat land and its control faces are modified, rather than the spool lands and their faces.

Referring now to that embodiment of the invention illustrated in FIG. 8, both control faces of the seat land have been modified to produce the desired result. As in the previously described embodiment, any desired number of ports may be used, but the symmetrical location of the ports around the long axis of the spool bore should be maintained. For ease in illustration, only two ports have been shown in each face of the land. Ports 62 and 63 are located diametrically opposite each other, and the same applies to ports 64 and 65 in the other face of the land. Ports 62 and 64 are aligned longitudinally along the spool bore as are ports 63 and 65. Each adjacent pair of ports are cut into the land at identical opposite acute angles 29. Each control face so formed includes two diametrically opposite co-planar portions 49 and 50, as in FIG. 6, the adjacent ends of which are connected by arcuate portions 35 which are offset axially into the land. The configuration of each seat land control face is thus substantially the same as the previously described control faces on the spool land, and their effect on the flow angle of the fluid is also substantially the same. If desired this type of control face can be used on both the spool lands and the valve body seat lands.

*Design data and operation*

FIGS. 4 and 5 illustrate the difference in the axial force imparted by the flowing fluid to a spool of conventional construction (FIG. 4) having truly annular planar control faces 17 and 18 lying in planes perpendicular to the spool axis and parallel to the annular control face of the seat land, and the axial force imparted to a spool constructed in accordance with my invention (FIG. 5).

The upper half of each of these drawing figures illustrates fluid flowing from chamber 10 to chamber 11, as indicated by the flow arrows. The relative lengths of force arrows 45 and 47 illustrate the relative magnitude of the axial forces imparted to the respective spools. The lower half of each of these figures illustrates fluid flowing from chamber 11 to chamber 10, and its relative effect on the spools, as indicated by the lengths of force arrows 46 and 48.

In both cases a control face of a spool land is immediately adjacent a control face of the seat land in a position to almost block the fluid flow. The flow effect is substantially the same, and the axial force is imparted to the spool in the same direction, whether the spool is being moved toward or away from a complete flow-blocking position. In other words the axial force resists movement of the spool away from a flow-blocking position and assists movement toward such a position.

In both figures the symbol $\theta$ and related arrows indicate the composite angle of flow of the fluid through the flow areas defined by the adjacent control faces on the spool and seat lands.

The formula for calculating the steady state flow force in a spool valve is $F = KQ\sqrt{P} \cos \theta$, in which Q indicates quantity or volume flow, P indicates the pressure, and $\theta$ the angle of fluid flow with respect to the spool or spool bore axis. The angle $\theta$ is dependent on the distance X (FIG. 4) and the angle $\phi$, or the distance $X^1$ (FIG. 5) and the undercut angle 29. In any specific valve the angles $\phi$ and 29 will be fixed. As the distance X decreases the angle $\theta$ decreases, and the axial force F imparted to the spool increases. F becomes maximum when the flow is being metered through the orifice defined by the spool land and seat land control faces at maximum pressure, i.e.—when $Q\sqrt{P}$ is maximum.

In the FIG. 4 valve construction fluid is metered through a truly annular orifice between the peripheries of the lands 17 and 42, and the opening required to meter the flow at maximum pressure is very small. Hence the distance X is small, the angle $\theta$ is small, and F is large, as indicated by the length of Force arrow 45.

In my valve as the control face on the land 15 approaches or begins to leave a flow-blocking position, the co-planar control face portions 49 and 50 lie in a plane common to the plane in which the seat land control face 41 lies. In this spool position fluid can then flow only through the uncovered axially offset portions of the spool land control face. Note that in my valve the corresponding distance $X^1$ has increased to several times the distance X in the FIG. 4 valve, and is equivalent to the offset distance 34.

Since the distance X has increased, the angle $\theta$ has increased materially, with a consequent very material reduction in F, the axial force imparted to the spool, as indicated by the reduced length of Force arrow 47.

Thus far only the effect of an increase in the distance X has been discussed. It will be understood that a considerable portion of this effect can be obtained even though the offset control face portion 35 lies in a plane perpendicular to the spool axis—in other words even if the angle 29 is equivalent to the angle $\phi$.

It has been established, however, that the undercutting of the control face portions 35 and 36 in both the FIG. 5 and FIG. 8 embodiments has a very material effect in further increasing the flow angle $\theta$, and consequently in further decreasing the axial force F. The effect of these undercut control face portions increases as the angle 29 is decreased. By carefully selecting the axial offset distance 34 and the undercut angle 29, the angle $\theta$ closely approaches 90°, and the axial force F approaches zero. The same principles apply equally well to the changing of the like described flow ports, control faces, angles, etc. of the FIG. 8 embodiment of my invention, wherein the ports are located in the seat land.

Since the port arrangement in each land is symmetrical about the spool axis it is obvious that the explained reduction in F will be accomplished by my spool construction regardless of whether the fluid flow is from passage 10 to passage 11, as in the upper portion of FIG. 5, or from passage 11 to passage 10, as in the lower portion of FIG. 5, and regardless of the direction in which the spool is being moved.

From the above it will be understood that my invention provides a spool valve construction which substantially eliminates the unbalanced axial forces imparted to the spool by fluid flow through a valve of conventional construction, thus affording accurate control of the valve by an operator without substantial interference by "side effects."

Having described the invention with sufficient clarity to enable those familiar with this art to construct and use it, I claim:

In a fluid flow control valve which includes a housing having a cylindrical bore and two axially spaced flow chambers separated by an annular seat land, and a flow control spool having two axially spaced lands separated by a reduced cross section shank, and in which the adjacent end faces of said lands define a flow path between said flow chambers, the adjacent end faces of said lands constituting flow control faces either of which is capable of cooperating with the seat land to isolate said flow chambers when the spool is moved axially a sufficient distance, the improvement which comprises: an elongated longitudinally disposed irregularly contoured flow path defined by adjacent ends of the two lands and by the shank between them, said path comprising opposed face portions sloping divergently inward from the peripheries of the respective lands at locations spaced axially in opposite directions from the respective control faces, and two wall portions sloping axially inward toward each other in opposite directions from said face portions at angles substantially normal to the respective face portions and intersecting at a point intermediate the ends of said shank.

References Cited in the file of this patent

UNITED STATES PATENTS

| | | |
|---|---|---|
| 2,812,775 | Hodgson | Nov. 12, 1957 |
| 2,856,960 | Stacey | Oct. 21, 1958 |
| 2,971,536 | Junck et al. | Feb. 14, 1961 |